Dec. 15, 1959  J. V. MILO  2,916,812
COUPLING INSERTING APPARATUS
Filed Nov. 8, 1956  3 Sheets-Sheet 1

INVENTOR.
JOSEPH V. MILO
BY
William A. Zaluck
ATTORNEY

Dec. 15, 1959  J. V. MILO  2,916,812
COUPLING INSERTING APPARATUS
Filed Nov. 8, 1956  3 Sheets-Sheet 2
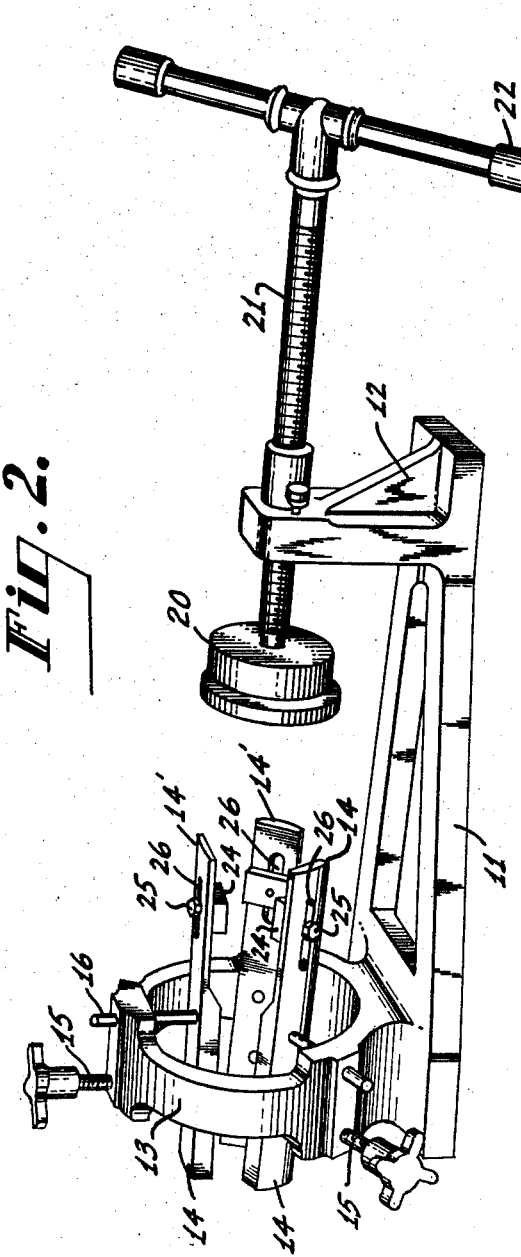
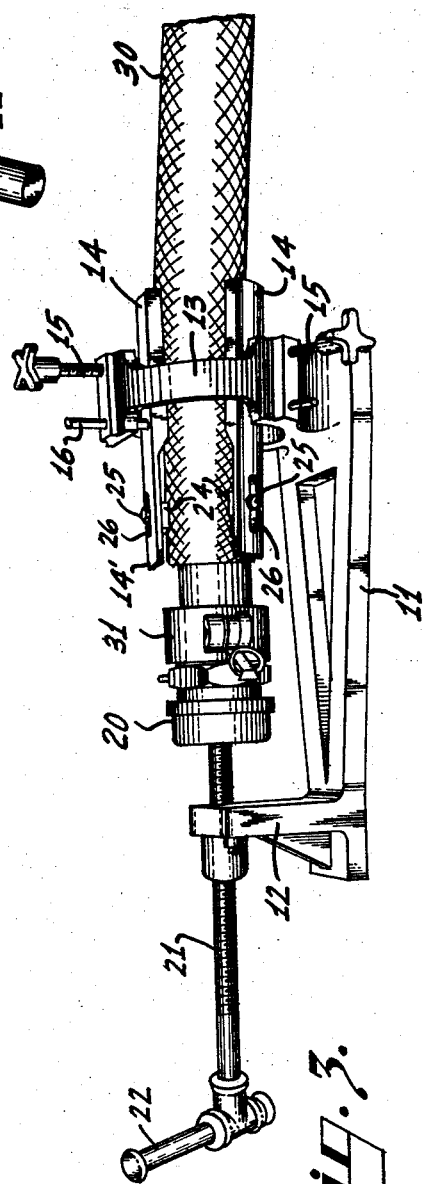
INVENTOR.
JOSEPH V. MILO
BY
William A. Zalesak
ATTORNEY Dec. 15, 1959    J. V. MILO    2,916,812
COUPLING INSERTING APPARATUS
Filed Nov. 8, 1956    3 Sheets-Sheet 3

INVENTOR.
JOSEPH V. MILO
BY
William G. Zalewski
ATTORNEY

United States Patent Office 2,916,812
Patented Dec. 15, 1959

2,916,812

COUPLING INSERTING APPARATUS

Joseph V. Milo, Union, N.J.

Application November 8, 1956, Serial No. 621,050

2 Claims. (Cl. 29—237)

My invention relates to an apparatus for inserting a coupling member into a flexible conduit such as a hose. Apparatus of this kind is normally referred to as a hose coupling press.

The method normally employed to insert a coupling into a hose is to hold the hose in an ordinary vise and press the coupling in by hand. Since it is seldom that the coupling diameter and the inside diameter of the hose are matched, it is customary to use couplings which require a tight fit. This makes it extremely difficult to push the coupling into the hose manually.

Furthermore, when so-called "soft wall" hose is used, that is hose without wire reinforcements, it is difficult to hold the hose in an ordinary vise. As a result, when trying to insert the coupling into the hose by twisting, the hose also twists, since a firm grip cannot be obtained in this case.

So far as applicant is aware, there are relatively few devices available for inserting couplings. These must be vertically mounted, or are specially designed only for specific hoses and are not universally adapted for all size hoses. Furthermore, these previously available pieces of equipment are heavy, not portable, and cannot be readily clamped on benches, for example. This is a further objectionable feature since, in many cases, the hose must be coupled on site such as in the case of tank trucks having broken hoses.

It is therefore a principal object of my invention to provide an improved apparatus for inserting couplings into flexible conduits such, for example, as hoses of the soft wall type or the reinforced type.

Another object of my invention is to provide a device of this kind which is universal in the sense that it can take a wide variety of hoses and couplings both as to variations in diameter and structure.

A further object of my invention is to provide such a device which is readily portable and which can be utilized in place on the bench or can be taken to the site of the hose where the coupling is to be inserted.

A further object of my invention is to provide such a device which can be used in horizontal or vertical position.

Other objects of the invention will appear in the following description with reference to the drawing, in which:

Fig. 2 is a perspective of the apparatus shown in Fig. 1;

Fig. 3 shows the apparatus in use in forcing the coupling member into the hose.

Briefly, an apparatus made according to my invention includes an elongated triangularly shaped base having supporting elements at each end. One of the supporting members is designed to receive the hose and is of annular shape and provided with a plurality of specially shaped adjustable clamps which grip the hose member received within the annular member and have means for preventing slipping of the hose while a coupling is being inserted. The other supporting member is provided with a replaceable coupling receiving cup-shaped member or adapter which may be moved parallel to the axis of the hose to force the coupling member into the hose while it is being held in the hose receiving member.

Figure 1:
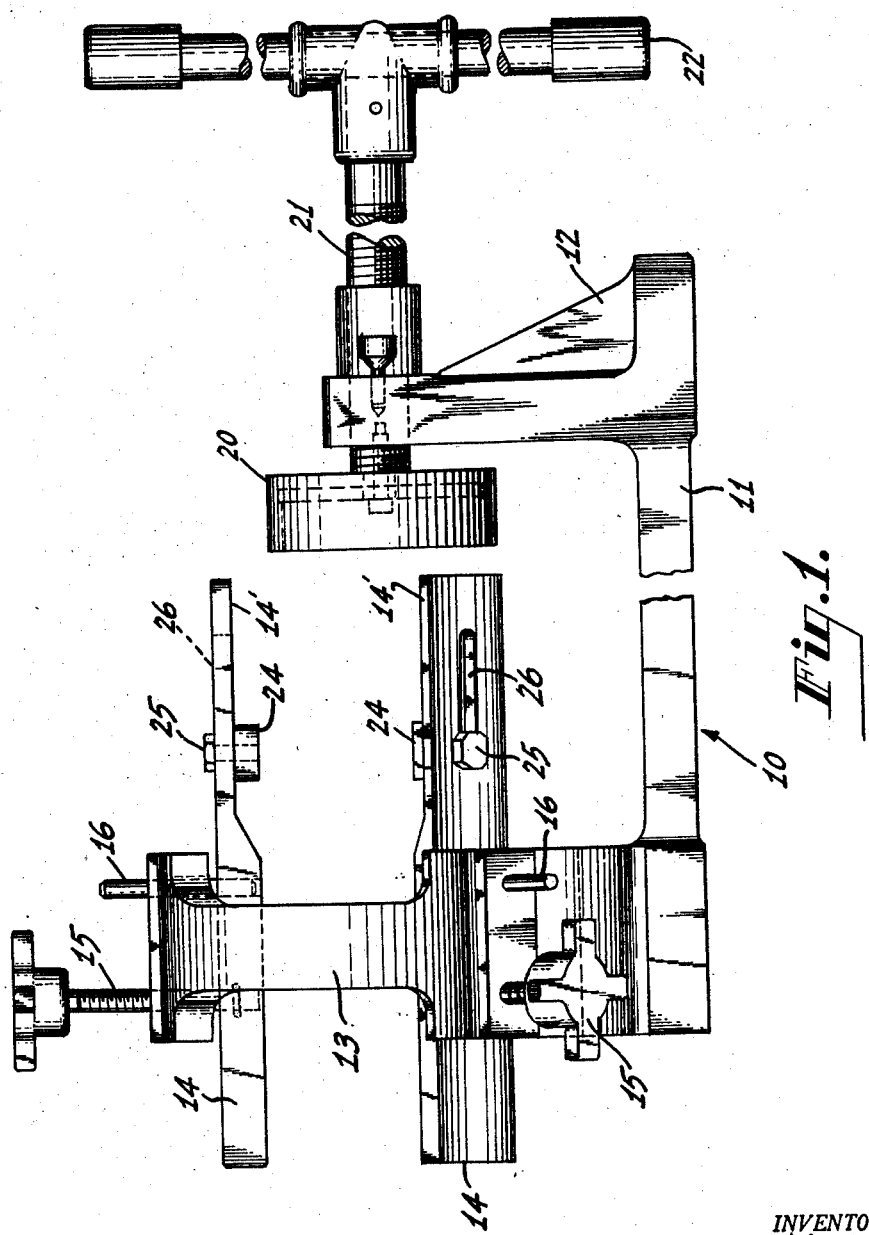
Fig. 1 is a side elevation of apparatus made according to my invention.
Figure 4:
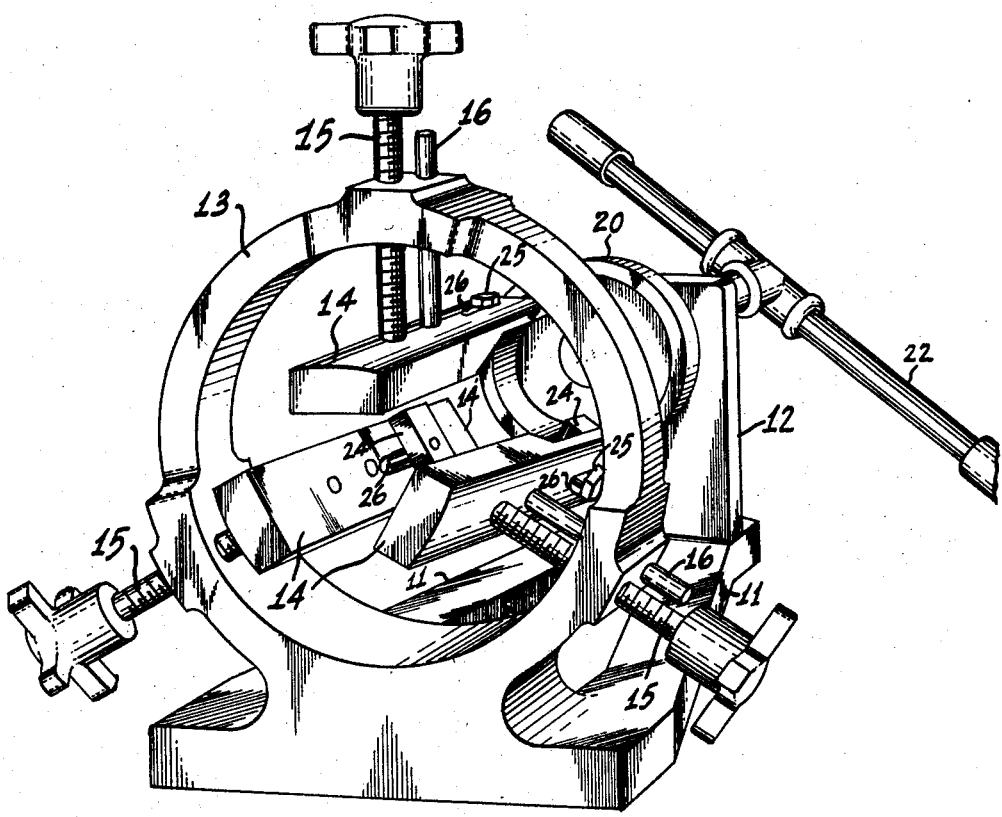
Fig. 4 is a perspective taken from the hose receiving end of apparatus shown in the other figures.

Referring to Figs. 1, 2 and 4, apparatus made according to my invention includes a frame member 10 having an elongated, triangularly shaped frame base 11 and at opposite ends a bracket 12 and an annular hose supporting member 13. Since the frame is not solid, it is not as heavy as a solid base yet provides a substantial three point support. The annular hose supporting member 13 is provided with a plurality, in this case three, hose clamping members 14 each of which is provided with a screw member 15 the end of which is within the clamp and threadedly engaging the member 13. Dowel pins or guides 16 are secured to the clamps and slidably extend through the hose supporting member 13 to insure that the clamps move readily in and out and that the gripping surfaces remain parallel to the surface of the hose being fitted with the coupling.

Mounted in the bracket 12 is an adapter assembly for receiving and forcing the coupling into the hose supported in the hose support. It includes a replaceable adapter 20 which can be quickly changed for different size couplings and hoses. It is rotatably supported at the end of a screw member 21 threadedly engaged in the bracket 12 and operated by means of the press handle 22.

The use of the apparatus is clearly shown in Fig. 3. It will be observed that the clamps 14 have been forced down against the hose 30 and the coupling member 31 is positioned within the adapter 20. By rotating the press handle, it is obvious that the coupling will be forced within a hose gripped by the hose receiving assembly.

It will be noted that clamps 14 have portions 14' of a depth or thickness less than the remainder of the clamps and that I provide blocks 24 having bolts or screws 25 for retaining the blocks in place or permitting slidable movement longitudinally of the hose in the slots 26. These blocks are used to prevent a soft hose from twisting easily within the clamps. These blocks extend into and impart stiffness to the hose. As the coupling is moved longitudinally into the hose, the blocks are moved along the slots provided. These blocks are not necessary as a general rule on reinforced hose.

The apparatus is simple in construction and many standard parts can be used. It is light, thus making it readily portable, and it can be used in any position.

While certain specific embodiments have been illustrated and described, it will be understood that various changes and modifications may be made therein without departing from the spirit and scope of the invention.

I claim:

1. Apparatus for inserting a coupling into a flexible hose including a suporting frame, a hose support mounted at one end of said frame and including an annular member, a plurality of elongated clamping elements within said annular member and extending parallel to each other longitudinally of said base, means for adjusting the position of said clamping elements within said annular member to move said clamping elements radially, and other means engaging said clamping elements and slidably supported in said annular member for insuring parallel relationship of said clamping elements, a bracket mounted at the other end of said frame, an adapter assembly mounted in said bracket for movement toward and from said clamping elements and including an adapter member for receiving a coupling, means for moving said adapter member toward and from said clamping elements for inserting a coupling within said hose, said clamping elements having end portions adjacent said adapter member of less depth than the other portions of said clamping elements, said portions adjacent said adapter member having slots therein and gripping blocks slidably mounted in said slots for engaging the surfaces of said hose to prevent twisting thereof during insertion of said coupling.

2. Apparatus for inserting a coupling into a flexible hose including a supporting frame, a hose support mounted at one end of said frame and including an annular member, a plurality of elongated clamping elements within said annular member and extending parallel to the axis of said member, and screw means for adjusting the position of said clamping elements within said annular member to move said clamping elements radially, pins engaging said clamping elements and slidably supported in said annular member for insuring parallel relationship of said clamping elements, a bracket mounted at the other end of said frame, an adapter assembly mounted in said bracket for movement toward and from said clamping elements and including an adapter for receiving a coupling, means for moving said adapter toward and from said clamping elements for inserting a coupling within said hose, said clamping elements having end portions adjacent said adapter of less depth than the other portions of said clamping elements, said portions adjacent said adapter having slots therein and blocks slidably mounted within said slots for engaging the surfaces of said hose to prevent twisting thereof during insertion of said coupling.

References Cited in the file of this patent

UNITED STATES PATENTS

| | | |
|---|---|---|
| 1,056,100 | Hill | Mar. 18, 1913 |
| 1,094,978 | Church | Apr. 28, 1914 |
| 1,763,886 | Gold | June 17, 1930 |
| 1,848,867 | Callaway | Mar. 8, 1932 |